(12) United States Patent
Nazari et al.

(10) Patent No.: US 9,830,239 B2
(45) Date of Patent: Nov. 28, 2017

(54) FAILOVER IN RESPONSE TO FAILURE OF A PORT

(71) Applicant: HEWLETT PACKARD ENTERPRISE DEVELOPMENT LP, Houston, TX (US)

(72) Inventors: Siamak Nazari, Fremont, CA (US); Roopesh Kumar Tamma, Fremont, CA (US); Nigel Kerr, Forsyth House Cromac Square (IE)

(73) Assignee: Hewlett Packard Enterprise Development LP, Houston, TX (US)

( * ) Notice: Subject to any disclaimer, the term of this patent is extended or adjusted under 35 U.S.C. 154(b) by 180 days.

(21) Appl. No.: 14/438,624

(22) PCT Filed: Jan. 30, 2013

(86) PCT No.: PCT/US2013/023725
§ 371 (c)(1),
(2) Date: Aug. 30, 2015

(87) PCT Pub. No.: WO2014/120136
PCT Pub. Date: Aug. 7, 2014

(65) Prior Publication Data
US 2015/0370668 A1 Dec. 24, 2015

(51) Int. Cl.
*G06F 11/00* (2006.01)
*G06F 11/20* (2006.01)
(Continued)

(52) U.S. Cl.
CPC ........ *G06F 11/2094* (2013.01); *G06F 3/0619* (2013.01); *G06F 3/0653* (2013.01);
(Continued)

(58) Field of Classification Search
CPC ............. G06F 11/2002; G06F 11/2005; G06F 11/2007; G06F 11/2089; G06F 11/2092;
(Continued)

(56) References Cited

U.S. PATENT DOCUMENTS 5,790,775 A * 8/1998 Marks ................. G06F 11/1658
714/5.11
6,496,740 B1 12/2002 Robertson et al.
(Continued)

FOREIGN PATENT DOCUMENTS

CN 101079795 A 11/2007
CN 101252428 A 8/2008
(Continued)

OTHER PUBLICATIONS

Extended European Search Report received in EP Application No. 13873588.1, dated Aug. 24, 2016, 10 pages.
(Continued)

*Primary Examiner* — Marc Duncan
(74) *Attorney, Agent, or Firm* — Trop, Pruner & Hu, P.C.

(57) ABSTRACT

A failure at a first port of the controller node is detected, where the first port is initially assigned a first port identifier and is associated with a logical path through a communications fabric between the first port and a port at a host device. In response to detecting the failure, the first port identifier is assigned to a second port to cause the logical path to be associated with the second port. In response to detecting resolution of the failure, a probe identifier is assigned to the first port. Using the probe identifier, a health of network infrastructure between the first port and the host device is checked. In response to the checking, the first port identifier is assigned to the first port to cause failback of the logical path to the first port.

16 Claims, 7 Drawing Sheets

(51) Int. Cl.
*H04L 12/24* (2006.01)
*H04L 12/939* (2013.01)
*H04L 12/935* (2013.01)
*G06F 3/06* (2006.01)
*H04L 29/08* (2006.01)

(52) U.S. Cl.
CPC ........ *G06F 3/0683* (2013.01); *H04L 41/0668* (2013.01); *H04L 49/30* (2013.01); *H04L 49/555* (2013.01); *H04L 49/557* (2013.01); *H04L 67/1097* (2013.01)

(58) Field of Classification Search
CPC .. G06F 11/2094; G06F 11/201; G06F 3/0619; G06F 3/0635; G06F 3/0653; G06F 3/0683; H04L 41/0668; H04L 49/30; H04L 49/555; H04L 49/557; H04L 67/1097
See application file for complete search history.

(56) References Cited

U.S. PATENT DOCUMENTS

| | | | |
|---|---|---|---|
| 6,578,158 B1 | 6/2003 | Deitz et al. | |
| 6,629,264 B1* | 9/2003 | Sicola | G06F 11/2007 714/15 |
| 6,715,098 B2 | 3/2004 | Chen et al. | |
| 6,775,230 B1 | 8/2004 | Watanabe et al. | |
| 6,990,068 B1 | 1/2006 | Saleh et al. | |
| 7,016,299 B2 | 3/2006 | Kashyap | |
| 7,360,010 B2 | 4/2008 | Ghaffari et al. | |
| 7,467,191 B1 | 12/2008 | Wang et al. | |
| 7,565,568 B1 | 7/2009 | Kumar et al. | |
| 7,778,157 B1 | 8/2010 | Tawri | |
| 7,778,488 B2 | 8/2010 | Nord et al. | |
| 7,818,408 B1* | 10/2010 | Ignatuk | G06F 11/2033 370/252 |
| 7,984,258 B2 | 7/2011 | Sicola | |
| 8,028,193 B2 | 9/2011 | Dake et al. | |
| 8,037,344 B2 | 10/2011 | Hara | |
| 8,274,881 B2 | 9/2012 | Allen | |
| 8,397,092 B2* | 3/2013 | Karnowski | H04L 12/12 370/431 |
| 8,443,232 B1* | 5/2013 | Nagineni | G06F 11/2046 714/13 |
| 8,626,967 B1* | 1/2014 | Naik | G06F 13/14 710/31 |
| 8,699,322 B1* | 4/2014 | Tawri | G06F 11/2005 370/216 |
| 8,711,684 B1* | 4/2014 | Usgaonkar | H04L 43/0811 370/216 |
| 8,732,339 B2 | 5/2014 | Shin et al. | |
| 8,839,043 B1* | 9/2014 | Long | G06F 11/2007 714/43 |
| 8,873,398 B2 | 10/2014 | Kempf et al. | |
| 8,909,980 B1* | 12/2014 | Lewis | G06F 11/00 714/4.11 |
| 8,949,656 B1* | 2/2015 | Ninan | G06F 11/2005 714/4.1 |
| 9,100,329 B1 | 8/2015 | Jiang et al. | |
| 9,118,595 B2* | 8/2015 | Hariharan | G06F 11/2007 |
| 9,298,566 B2* | 3/2016 | LeFevre | G06F 11/2033 |
| 2004/0049573 A1 | 3/2004 | Olmstead et al. | |
| 2004/0054866 A1* | 3/2004 | Blumenau | G06F 3/0605 711/202 |
| 2004/0081087 A1 | 4/2004 | Shea | |
| 2004/0151188 A1 | 8/2004 | Maveli et al. | |
| 2006/0090094 A1 | 4/2006 | McDonnell et al. | |
| 2006/0171303 A1 | 8/2006 | Kashyap | |
| 2006/0274647 A1* | 12/2006 | Wang | H04L 45/00 370/216 |
| 2008/0059664 A1 | 3/2008 | Unger | |
| 2009/0106475 A1 | 4/2009 | Arndt et al. | |
| 2010/0097941 A1 | 4/2010 | Carlson et al. | |
| 2010/0107000 A1* | 4/2010 | Wakelin | H04L 69/40 714/4.11 |
| 2011/0228670 A1 | 9/2011 | Sasso et al. | |
| 2011/0317700 A1 | 12/2011 | Assarpour | |
| 2012/0233491 A1 | 9/2012 | Chen | |
| 2012/0324137 A1 | 12/2012 | Jinno et al. | |
| 2013/0151888 A1* | 6/2013 | Bhattiprolu | G06F 11/2007 714/6.3 |
| 2015/0269039 A1 | 9/2015 | Akirav et al. | |

FOREIGN PATENT DOCUMENTS

| | | |
|---|---|---|
| CN | 101599853 A | 12/2009 |
| CN | 102137009 A | 7/2011 |
| CN | 102780587 A | 11/2012 |
| EP | 2017711 A2 | 1/2009 |
| EP | 2523113 A2 | 11/2012 |
| WO | WO-2012103758 | 9/2012 |

OTHER PUBLICATIONS

EMC, White Paper, EMC Powerpath Load Balancing and Failover—Comparison with native MPIO operating system solutions, Feb. 2011 (28 pages).

Henry Newman—Website—www.enterprisestorageforum.com—Getting Failover Right, Oct. 7, 2004 (6 pages).

Hewlett Packard, HP LTO-5 Tape Libraries Using Data Path Failover and Control Path Failover, HP Part No. AK378-96050, Oct. 2011 (39 pages).

ISR/WO, PCT/US2013/023725, HP reference 83129110, dated Oct. 25, 2013, 10 pps.

Storage Area Network Quick Configuration Guide: Access Gateway NPIV with EFCM Management, (Research Paper), Nov. 17, 2007, 15 pps., http://www.brocade.com/downloads/documents/technical_briefs/AG_NPIV_Quick_Config_GA-CG-059-00.pdf.

Wikipedia, NPIV—N_Port ID Virtualization, Sep. 14, 2012 (1 page).

Alvin Cox, "Information technology—Serial Attached SCSI-3 (SAS-3)", Seagate Technology, Apr. 23, 2012 (291 pages).

Barry Olawsky et al., SFF Committee, SFF Committee SFF-8449 Specification for Shielded Cables Management Interface for SAS, ftp://ftp.seagate.com/sff, Sep. 18, 2013 (16 pages).

George Penokie, "Information technology—SAS Protocol Layer-2 (SPL-2)", LSI Corporation, May 10, 2012 (830 pages).

Gibbons, T. et al., "Switched SAS Sharable, Scalable SAS Infrastructure," White Paper, Oct. 2010 (8 pages).

Harry Mason, "Advanced Connectivity Solutions Unleash SAS Potential", SCSI Trade Association White Paper, Oct. 2009 (18 pages).

SFF Committee, "SFF Committee SFF-8636 Specification for Management Interface for Cabled Environments", ftp://ftp.seagate.com/sff, Jun. 19, 2015 (60 pages).

SFF Committee, "SFF-8644 Specification for Mini Multilane 4/8X 12 Gb/s Shielded Cage/Connector (HD12sh)", ftp://ftp.seagate.com/sff, Sep. 22, 2014 (7 pages).

* cited by examiner

FAILOVER IN RESPONSE TO FAILURE OF A PORT

CROSS-REFERENCE TO RELATED APPLICATION

This application is a national stage application under 35 U.S.C. §371 of PCT/US2013/023725, filed Jan. 30, 2013.

BACKGROUND

Host devices are able to access data stored at storage devices. In a network arrangement, access of the storage devices can be managed by controller nodes that are interconnected by a communications fabric to the host devices.

The host devices are able to submit data requests to the controller nodes. In response to the data requests from the host devices, the controller nodes can submit corresponding data requests to the storage devices to access (read or write) data of the corresponding storage devices.

BRIEF DESCRIPTION OF THE DRAWINGS

Some embodiments are described with respect to the following figures.

DETAILED DESCRIPTION

Figure 1:
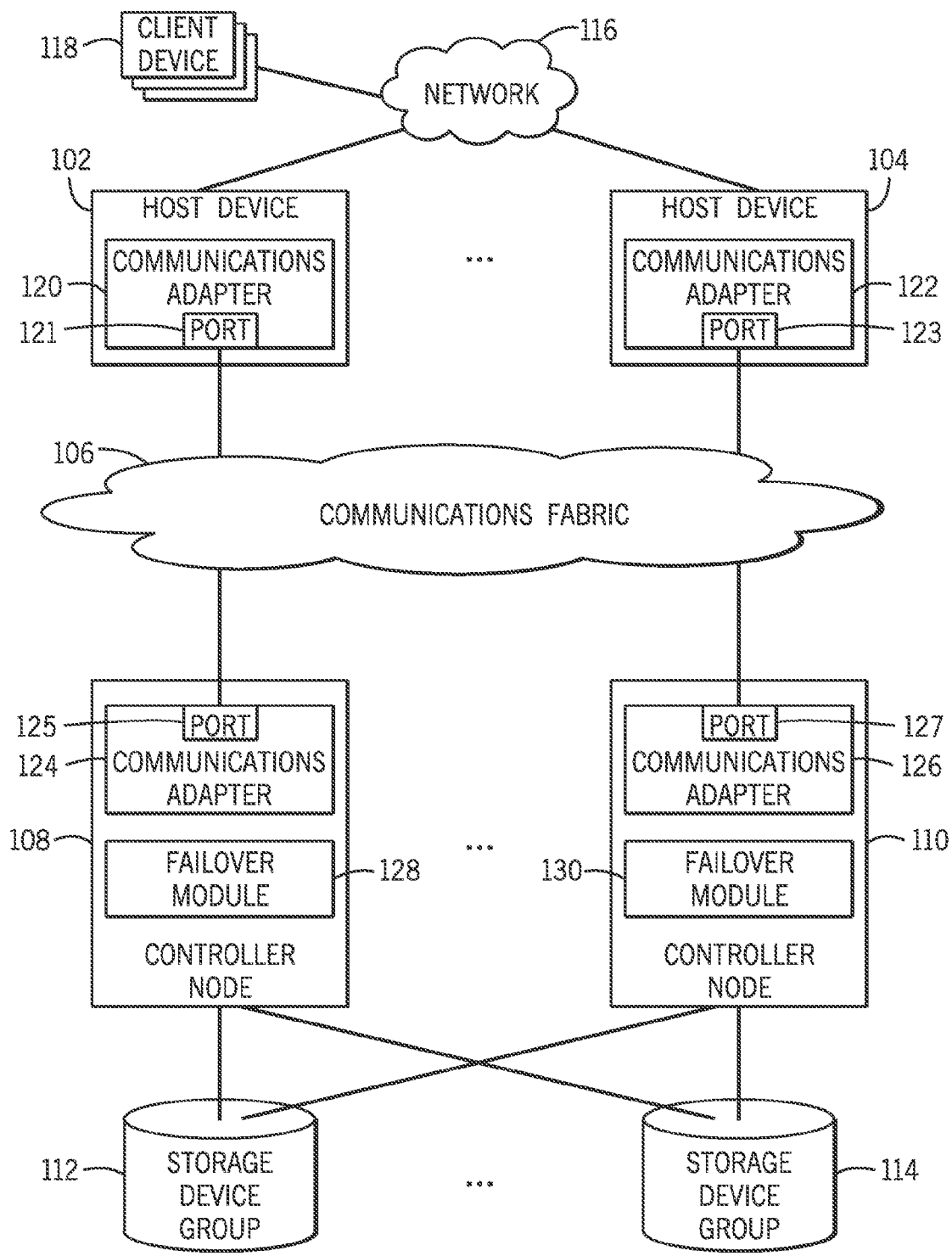
FIG. 1 is a block diagram of an example network arrangement according to some implementations.

Controller nodes that manage access of storage devices can include storage array controllers or other types of controllers. A controller node is coupled to one or multiple storage devices (e.g. disk-based storage devices, integrated circuit memory devices, etc.). In some arrangements, the storage devices can be part of respective groups of storage devices. For example, the groups of storage devices can include arrays of storage devices.

In some configurations, each controller node manages access of its respective group of storage device(s). In other configurations, each controller node is able to access multiple groups of storage devices.

A controller node can receive a data request from a host device through a path in a communications fabric to host devices. The communications fabric can be a storage area network (e.g. Fibre Channel storage area network) or other type of network. In response to a data request from a host device, a controller node submits a corresponding data request to a group of storage device(s) to read or write data of such group.

The host devices can be server computers, which are coupled to client devices. Client devices can submit data requests to the host devices, which in turn submit corresponding data requests to the controller nodes. In other examples, a host device can itself be a client device that is able to generate data requests (without having to first receive data requests from another client device).

Failures can occur in a network arrangement that has host devices and controller nodes. The failures can occur at various points in the network arrangement, including the controller nodes, the communications fabric, or at other points. A failure can include any of the following: malfunction or fault of hardware equipment, malfunction or fault of machine-readable instructions (software and/or firmware), a failure caused by an attack by malware (e.g. virus, worm, spyware, etc.), or any other condition that prevents normal operation of a storage system that includes the controller nodes, storage devices, and host devices.

Traditionally, to respond to a failure that prevents successful communication over a path between a host device and a controller node, logic in the host device can be used to perform a failover from the failed path to a different path. In some examples, such logic can include a multi-pathing module that is able to selectively perform data communications over any one of multiple paths between a host device and controller nodes. The multi-pathing module can perform load balancing (to balance the data access load across multiple paths), as well as to provide failover support to fail over from one path to another path in case of a detected failure.

However, employing logic in a host device to perform failover involves making a change at the host device. When failover is performed at the host device, the host device would mark a path associated with the failure as being unavailable. As a result, the host device would no longer be able to use such path, which can reduce input/output communications capacity and can affect load balancing and/or other tasks performed at the host device.

In accordance with some implementations, instead of performing failover at a host device, failover can instead be performed (at least in part) at a controller node. The failover performed at a controller node can be transparent to a host device. In addition, failback can also be performed at a controller node if the failure condition that caused the failover is later resolved. As discussed further below, the failback is a reliable failback that first performs a health check to ensure that the network infrastructure is healthy prior to performing failback. Failback can refer to a process of returning data communications to the component that had previously failed (and thus caused a failover) and which has subsequently resumed normal operation (in other words, the failure condition has been resolved).

FIG. 1 illustrates an example network arrangement that includes host devices 102, 104, which are interconnected by a communications fabric 106 to controller nodes 108, 110. The communications fabric 106 can be a Fibre Channel storage area network, or another type of network. Although not shown in FIG. 1, the communications fabric 106 can include one or multiple switching devices to couple the host devices 102, 104 to the controller nodes 108, 110.

The network arrangement can include two or more host devices 102, and/or two or more controller nodes 108. The controller nodes 108 and 110 manage access of data in storage device groups 112, 114, where a storage device group can include any group of one or multiple storage devices. In the example of FIG. 1, each controller node 108, 110 is able to access each of the storage device groups 112, 114. In other examples, a controller node is able to access just its associated storage device group.

As further depicted in FIG. 1, the host devices 102, 104 can be interconnected over a network 116 (e.g. local area network, wide area network, Internet, etc.) to client devices 118. Examples of client devices 118 include desktop computers, notebook computers, tablet computers, smartphones, personal digital assistants, and so forth. Client devices 118 can submit data requests to the host devices 102, 104, which in turn can submit corresponding data requests through the communications fabric 108 to the respective controller nodes 108, 110. In other examples, one or multiple ones of the host devices 102, 104 can themselves be client devices. Thus, as used here, a "host device" can refer to any type of electronic device that is able to send a data request to a controller node to access data in a storage device that is managed by the controller node.

As further depicted in FIG. 1, communications adapters 120, 122, 124, and 126 are provided in the respective host devices 102, 104, and controller nodes 108, 110. In some examples, the communications adapters 120, 122, 124, and 126 can include host bus adapters (HBAs), such as those used for communications over Fibre Channel links. In other examples, the communications adapters 120, 122, 124, and 126 can include other types of network interfaces. Each communications adapter 120, 122, 124, or 126 can include a respective port 121, 123, 125, or 127 for communicating over the communications fabric 106.

Although FIG. 1 depicts just one communications adapter in each host device or controller node, it is noted that in other examples, a host device or controller node can include multiple communications adapters with associated ports.

Each port can be assigned a port identifier, which can identify the respective communications adapter. In some examples, a port identifier can be a port world wide name (WWN). In other examples, a port identifier can be another type of identifier.

A logical path can be established between a port identifier (e.g. port WWN) of a port in a host device and a port identifier (e.g. port WWN) of a port in a controller node. Communications between a host device and a controller node can occur through the logical path. A logical path differs from a physical path. A physical path can include a specific set of physical links between a specific host device port and a specific controller node port. However, a logical path is defined by port identifiers. If a port identifier of a controller node port is re-assigned to a different controller node port, the logical path remains the same (since it is defined by port identifiers); however, after the port identifier re-assignment, the logical path provides communications between a different pair of ports.

As further depicted in FIG. 1, failover modules 128 and 130 are provided in the respective controller nodes 108 and 110. Each failover module 128 or 130 is able to detect failure associated with a respective controller node port. The failure can occur in the controller node 108, or the failure can be due to a fault condition that exists in equipment of the communications fabric 106. For example, the failure can be caused by a cable malfunction or defect. Examples of equipment failure can include failure of an HBA or fault of machine-readable instructions such as software and firmware. In addition, a failure can be indicated if data communications exhibits a relatively large number of data errors, such as based on cyclic redundancy check (CRC) detection.

In other implementations, the failover modules 128 and 130 can be provided outside the respective controller nodes 108 and 110. As described further below, the failover modules 128 and 130 can also perform failback, in case the failure condition that caused a failover is later resolved.

Figure 2A:
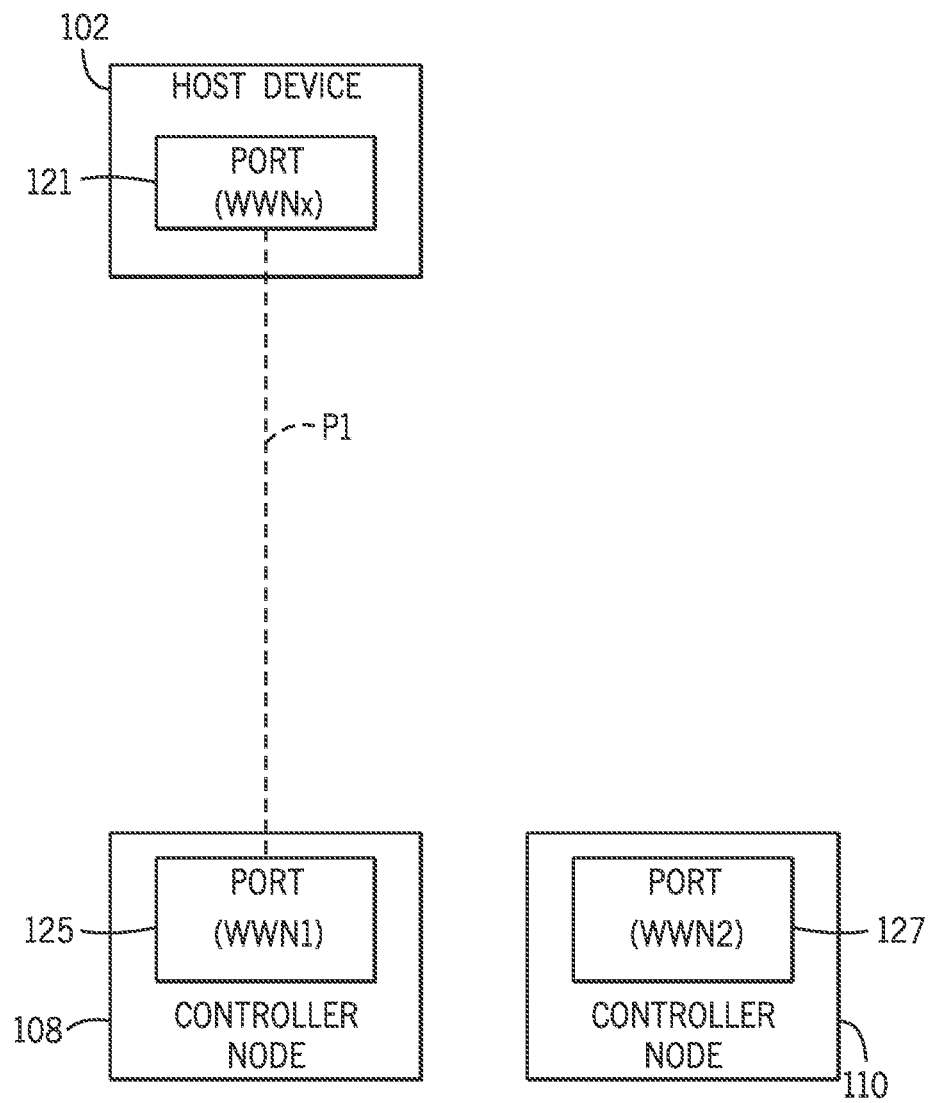
FIGS. 2A-2B are schematic diagrams illustrating an example failover procedure according to some implementations.
Figure 2B:
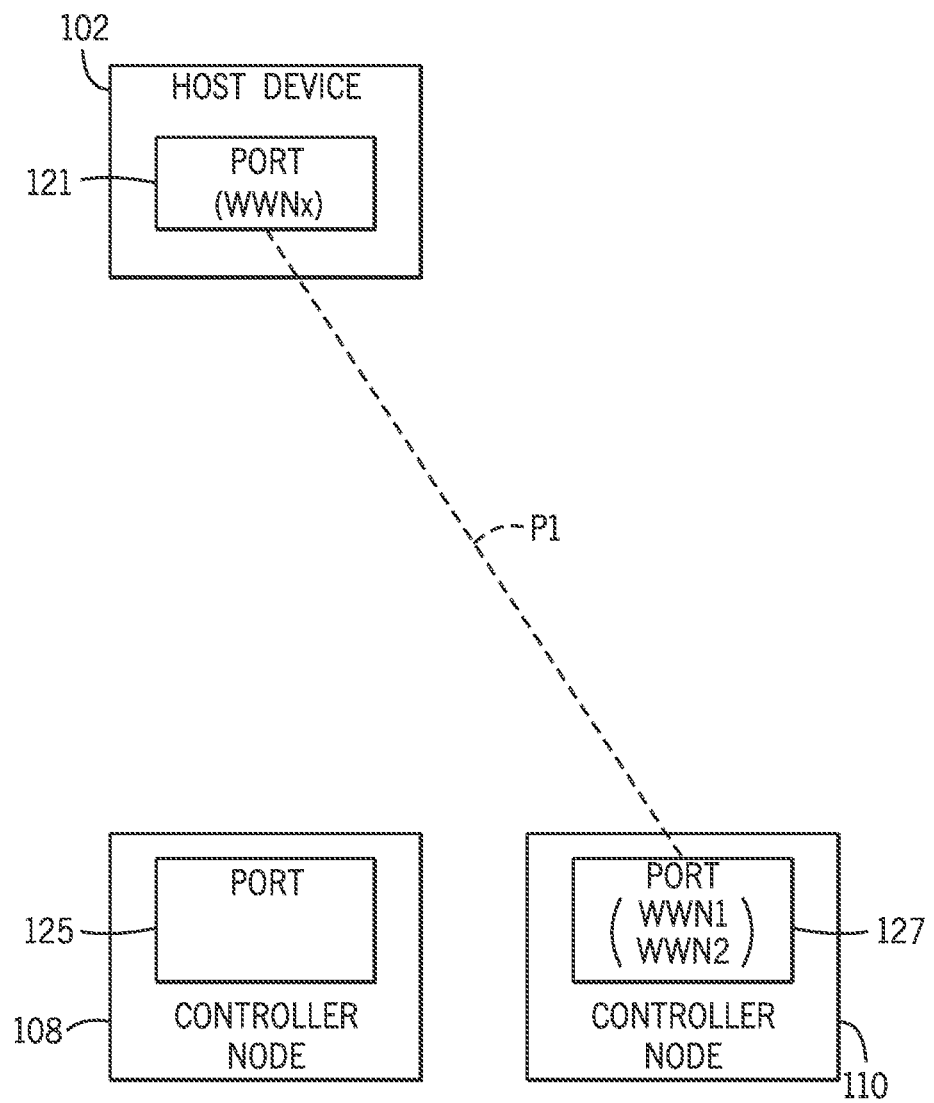

As an example, upon detecting a failure that prevents the controller node port 125 from communicating over the communications fabric 106 with the host device port 121, the failover module 128 in the controller node 108 is able to initiate a failover procedure. In accordance with some implementations, as depicted in FIGS. 2A and 2B, the failover procedure involves re-assigning the port identifier (e.g. WWN1) of the controller node port 125 to another controller node port. In the example of FIGS. 2A and 2B, the port identifier WWN1 initially assigned to the port 125 in the controller node 108 can be re-assigned to the port 127 in the controller node 110. In other examples, if the controller node 108 has multiple communications adapters with respective ports, the failover can cause reassignment of the port identifier WWN1 from a first port of the controller node 108 to a second port of the controller node 108.

In the example of FIGS. 2A and 2B, it is assumed that the host device port 121 is assigned a port identifier WWNx. In such example, a logical path P1 is established between the WWN1 and WWNx. Prior to re-assignment of the port identifier WWN1 as part of a failover procedure, communications over the logical path P1 can occur between the host device port 121 and the controller node port 125, as depicted in FIG. 2A.

In FIG. 2A, the controller node port 125 can be considered an active port for logical path P1, while the controller node port 127 can be considered a backup port for logical path P1. After failover has been completed as depicted in FIG. 2B, the controller node port 127 becomes the active port for logical path P1, while the controller node port 125 becomes the backup port for logical path P1.

After re-assignment of WWN1 from the controller node port 125 to the controller node port 127, communications over the logical path P1 (still defined between WWN1 and WWNx) can occur between the host device port 121 and the controller node port 127, as depicted in FIG. 2B. The controller node port 125 becomes the backup port for logical path P1.

More generally, prior to re-assigning WWN1, the logical path P1 is associated with the controller node port 125. However, after re-assigning WWN1, the logical path is associated with the controller node port 127.

If the failure condition at the controller node port 125 is later resolved such that the failure condition no longer exists, the controller node port 125 can be reactivated and WWN1 can be re-assigned from the controller node port 127 back to the controller node 125. Thus, the failover procedure can further perform failback by re-assigning WWN1 back to the controller node port 125, at which point the logical path P1 is as depicted in FIG. 2A. The failover module 128 or 130 can be notified of the resolution of the failure condition, and this notification can trigger the failback.

In accordance with some implementations, prior to performing the failback, the controller node port 125 to which the failback is to occur can first be temporarily assigned a probe identifier, which can be another WWN (different from WWN1 and WWN2). The probe identifier can be used for the purpose of checking the health of the network infrastructure (including physical paths and switches) between the controller node port 125 and the host device 102. Checking the health of the network infrastructure avoids a ping-pong failover/failback scenario where a failover of the logical path P1 first occurs from the controller node port 125 to the controller node 127, followed by failback from the controller node port 127 back to the controller node 125, followed further by another failover from the controller node port 125 to the controller node port 127 should it be determined that the network infrastructure between the controller node port 125 and the host device 102 is not healthy.

Checking the health of the network infrastructure can include checking to ensure that components (including physical paths and switches) of the network infrastructure are working properly so that communications can occur between the controller node port 125 and the host device port 121. In addition, checking the health of the network infrastructure can also include checking to ensure that there is a valid physical path from the controller node port 125 to the host device port 121. In an example where there are multiple communications fabrics, the controller node port 125 may have been re-connected to a different communications fabric following the initial failover from the controller node port 125 to the controller node port 127. The host device port 121 may not be connected to the different communications fabric, and thus re-assigning the logical path P1 back to the controller node port 125 may result in a situation where communications is not possible between the controller node port 125 and the host device port 121 over the logical path P1.

From the perspective of the host device 102, the failover and failback at the controller nodes 108 and 110 is transparent to the host device 102. In the present discussion, a failover procedure can include both failover and failback. After failover and any subsequent failback, the logical path P1 between WWN1 and WWNx remains visible to the host device 102, which can continue to use the logical path P1 for communications.

In the example of FIGS. 2A and 2B, note that, prior to the failover, the controller node port 127 was already assigned a port identifier (e.g. WWN2), which can define another logical path between WWN2 and a host device port identifier. As a result, if the failover procedure causes re-assignment of WWN1 from the controller node port 125 to the controller node port 127, the controller node port 127 would be associated with multiple port WWNs (WWN1 and WWN2) after the failover completes. To allow for a physical port (e.g. controller node port 127) to be associated with multiple port identifiers, N_Port Identifier Virtualization (NPIV) can be provided at the controller nodes 108 and 110. NPIV is a Fibre Channel mechanism that allows multiple port identifiers (e.g. port WWNs) to be associated with a single physical port. In other examples, other mechanisms can be used to allow multiple logical port identifiers to be assigned to the same physical port.

After failover, the controller node port 127 can potentially communicate over multiple different logical paths, including the logical path P1 between WWNx and WWN1, and another logical path between a host device port identifier and WWN2.

Figure 3:
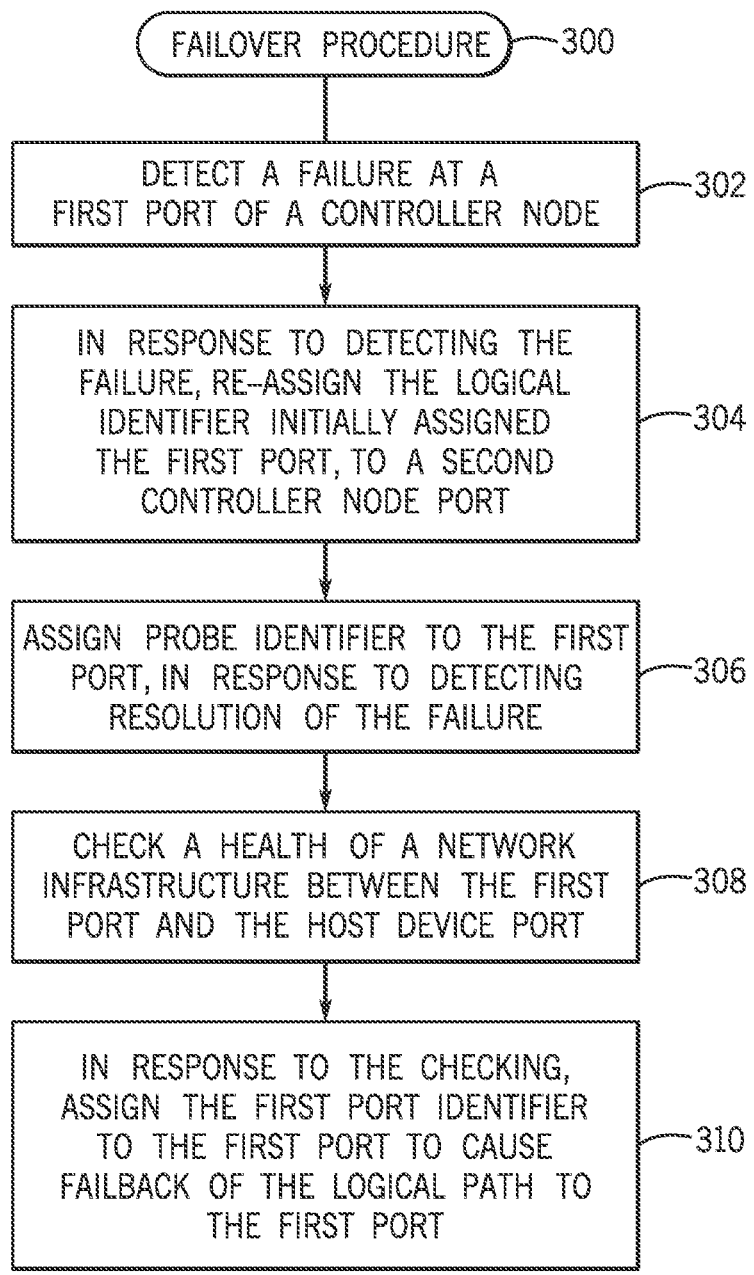
FIG. 3 is a flow diagram of a failover procedure according to some implementations.

FIG. 3 is a flow diagram of a failover procedure 300 according to some implementations. The failover procedure can be performed by a failover module (e.g. 128 in FIG. 1) in a controller node or a combination of failover modules (e.g. 128 and 130 in FIG. 1) in multiple controller nodes. The failover procedure 300 includes detecting (at 302) a failure at a first port of a controller node in a storage system. The failure at the first port can be caused by failure in the controller node, or failure in the communications fabric 106 (FIG. 1). The first port is initially assigned a first port identifier and is associated with a logical path through the communications fabric 106 between the first port and a port at a host device.

In response to detecting the failure, the failover procedure 300 re-assigns (at 304) the first port identifier to a second port in the storage system to cause the logical path to be associated with the second port. The second port can be another port of the same controller node, or alternatively, the second port can be a port of another controller node.

Subsequently, in response to detecting resolution of the failure, the failover procedure 300 assigns (at 306) a probe identifier to the first port. The assignment of the probe identifier to the first port can be a temporary assignment. Resolution of the failure can be detected by the failover module 128 or 130; alternatively, resolution of the failure can be indicated by equipment in the communications fabric 106 to the failover module 128 or 130. Using the probe identifier, the failover procedure 300 checks (at 308) a health of a network infrastructure between the first port and the port of the host device. In response to the checking indicating that the network infrastructure is healthy, the failover procedure 300 assigns (at 310) the first port identifier to the first port to cause failback of the logical path to the first port.

Checking of the health of the network infrastructure can be accomplished as follows, in accordance with some examples. After the first port has been assigned the probe identifier (which can be a probe WWN), the first port attempts to login to the communications fabric 106 using the probe identifier. The login is performed with a server in the communications fabric 106. If login is unsuccessful, that is an indication that the network infrastructure is not healthy, and thus failback of the logical path back to the first port would not be performed.

If login is successful, the failover module 128 (or another entity associated with the first port) can perform a communications test of the network infrastructure. Login of the first port using the probe identifier allows the first port to perform communications over the communications fabric 106. For example, the test can be a loopback test in which test packets can be sent from the first port to the host device port, to obtain a response from the host device port. If a response can be obtained from the host device port in response to the test packets, then the network infrastructure is determined to be healthy. More generally, the test can involve performing a test communication in the communications fabric 106 for ascertaining the health of the communications fabric for communications between the first port and the host device port.

Once the health of the network infrastructure between the first port at the controller node and the host device port has been confirmed, the first port can logout the probe identifier from the communications fabric 106. At this point, the failback performed at 310 can proceed.

Figure 4A:
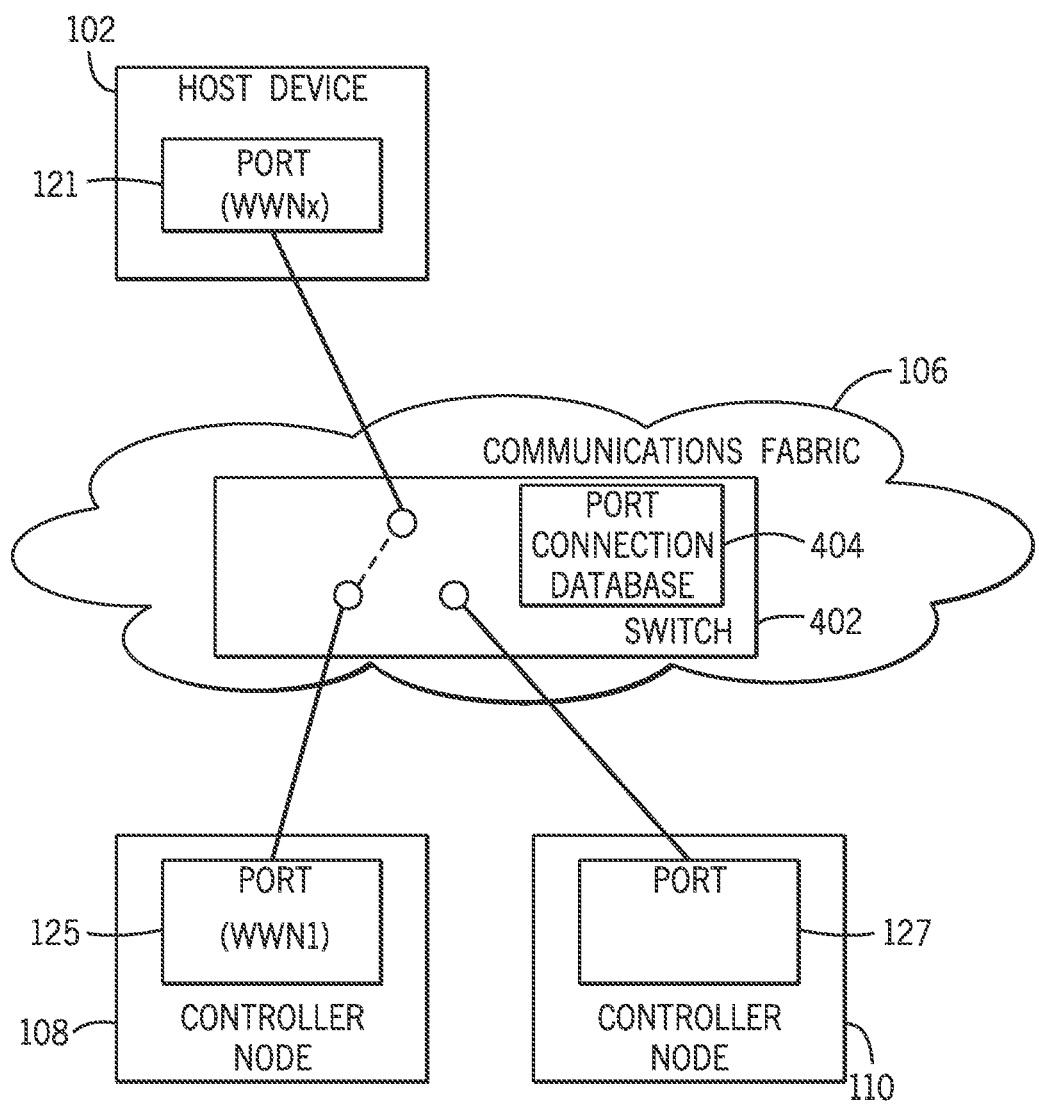
FIGS. 4A-4B are schematic diagrams illustrating an example failover procedure according to further implementations.
Figure 4B:
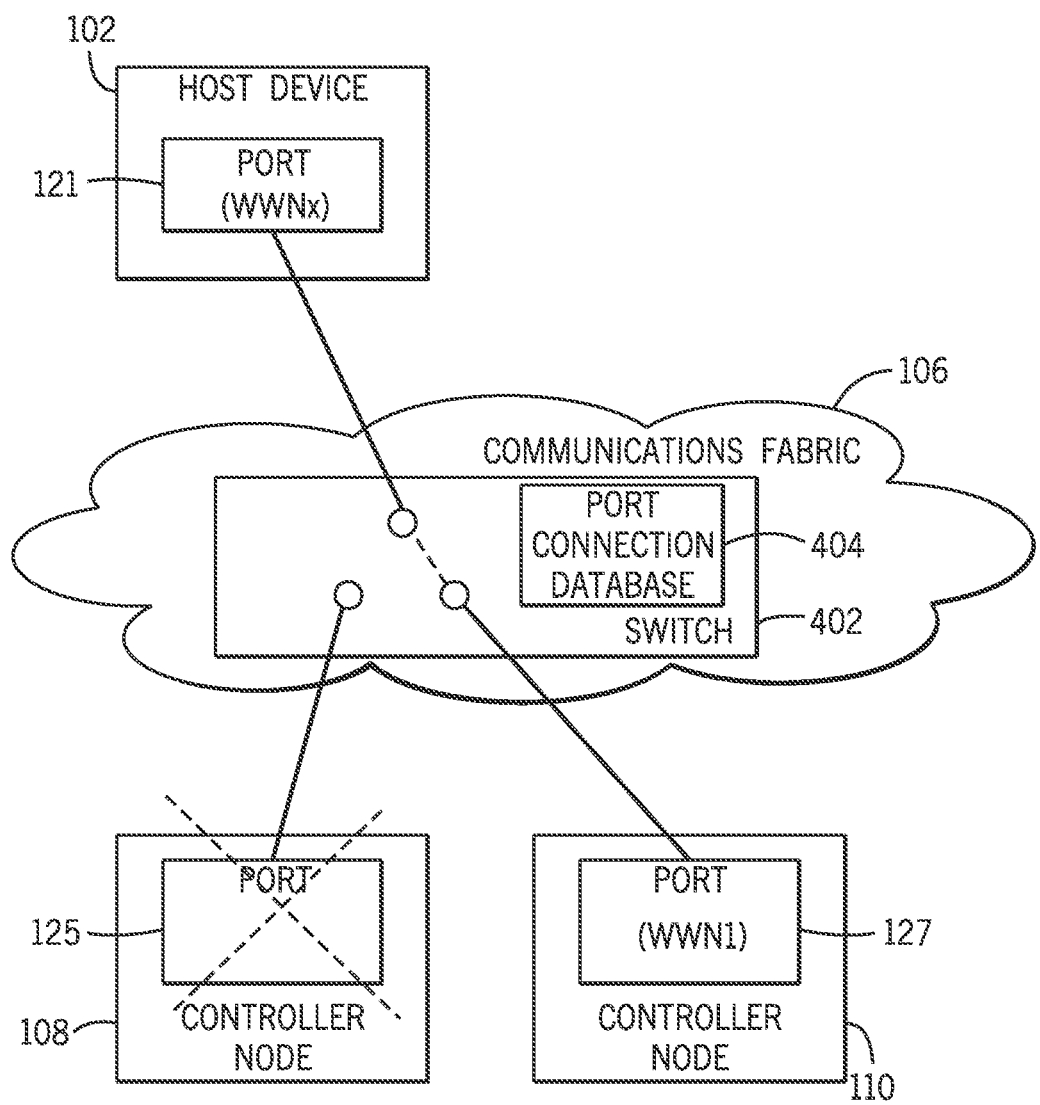

FIGS. 4A and 4B depict a failover arrangement according to further implementations. In FIG. 4A, a logical path is established between WWNx (port identifier of the host device port 121), and WWN1 (port identifier initially assigned to the controller node port 125). As further depicted in FIG. 4A, a switch 402 in the communications fabric 106 interconnects the host device port 121 to the controller node port 125.

FIG. 4B depicts failure (represented by an "X") of the controller node port 125. As a result of this failure, the failover module 128 (FIG. 1) in the controller node 108, either by itself or in cooperation with the failover module 130 in the controller node 110, performs a failover procedure to re-assign WWN1 from the controller node port 125 to the controller node port 127, as depicted in FIG. 4B. As part of this reassignment, the failover module(s) 130 and/or 132 cooperate with the switch 402 to re-connect the host device port 121 to the controller node port 127. Note that, even though the physical path has been changed by the switch 402, the logical path remains unchanged, since the logical path is still established between WWN1 and WWNx.

In accordance with some implementations, the switch 402 includes a port connection database (or other data structure) 404. The port connection database 404 has multiple entries, where each entry maps a host device port identifier (e.g. port WWN) to a respective host device physical port, and maps a controller node port identifier (e.g. port WWN) to a respective controller node physical port. As part of the failover procedure, the port connection database 404 is updated, based on interaction between the failover module(s) 128 and/or 130 and the switch 402. The respective entry of the port connection database 404 is updated to indicate that the port identifier WWN1 is re-assigned to the physical port 127, rather than physical port 125.

If a failback is subsequently performed in response to resolution of the failure, in which the port identifier WWN1 is assigned back to the physical port 125, then the respective entry of the port connection database 404 can be updated again.

Figure 5:
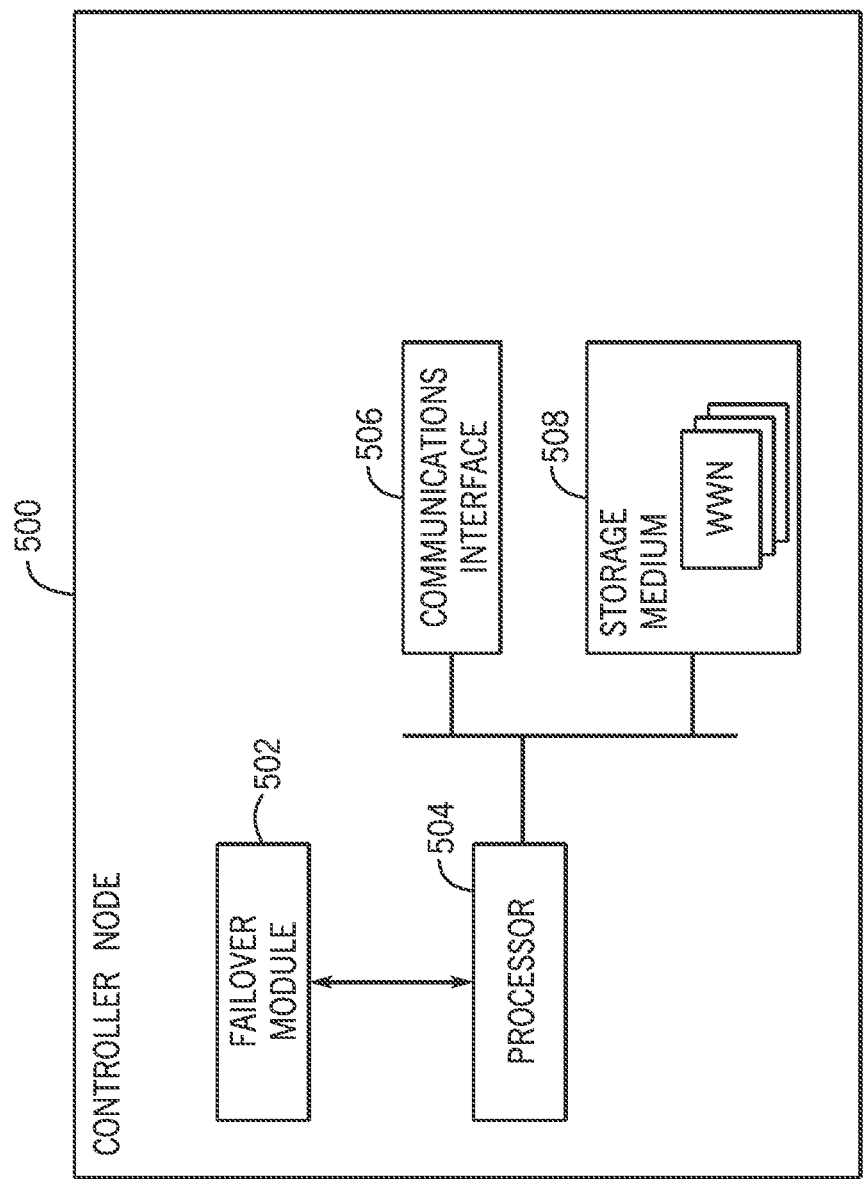
FIG. 5 is a block diagram of a controller node according to some implementations.

FIG. 5 is a block diagram of an example controller node 500, which can be the controller node 108 or 110 of FIG. 1, for example. The controller node 500 has a failover module 502, which can be the failover module 128 or 130 of FIG. 1. The failover module 502 can be implemented as machine-readable instructions that are executable on one or multiple processors 504. A processor can include a microprocessor, microcontroller, processor module or subsystem, programmable integrated circuit, programmable gate array, or another control or computing device.

The processor(s) 504 can be connected to a communications interface 506 (e.g. communications adapter 124 or 126 in FIG. 1) and a storage medium (or storage media) 508. The storage medium (or storage media) 508 can store WWN(s) assigned to port(s) of the controller node 500.

The storage medium (or storage media) 508 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A failover method for a storage system, comprising:
   detecting a failure at a first port of a controller node in the storage system, wherein the first port is initially assigned a first port identifier and is associated with a logical path through a communications fabric between the first port and a port at a host device;
   in response to detecting the failure, assigning the first port identifier to a second port of the storage system to cause the logical path to be associated with the second port;
   in response to detecting resolution of the failure, assigning a probe identifier to the first port;
   using the probe identifier, checking a health of a network infrastructure between the first port and the host device, wherein the probe identifier is a port world wide name temporarily assigned to the first port to check the health of the network infrastructure between the first port and the host device; and
   in response to the checking, assigning the first port identifier to the first port to cause failback of the logical path to the first port.

2. The method of claim 1, wherein assigning the first port identifier comprises assigning a port world wide name.

3. The method of claim 1, further comprising using the probe identifier to login to the communications fabric, wherein checking the health is performed after performing the login.

4. The method of claim 3, wherein checking the health includes performing a test communication in the communications fabric.

5. The method of claim 1, wherein assigning the first port identifier to the second port causes the second port to be associated with the first port identifier and a second port identifier.

6. The method of claim 5, further comprising:
   communicating, by the second port, data over the logical path using the first port identifier, wherein the logical path is established between the first port identifier and a host device port identifier; and
   communicating, by the second port, data over a second logical path using the second port identifier, wherein the second logical path is established between the second port identifier and a host device port identifier.

7. The method of claim 1, wherein the logical path is established between the first port identifier and a second port identifier assigned to the port at the host device.

8. The method of claim 7, further comprising:
   prior to the assigning of the first port identifier to the second port, communicating data through the logical path between the first port and the port at the host device; and
   after the assigning of the first port identifier to the second port, communicating data through the logical path between the second port and the port at the host device.

9. The method of claim 1, wherein the second port is part of the controller node or another controller node.

10. The method of claim 1, wherein the first port is indicated as an active port for the logical path and the second port is indicated as a backup port for the logical path prior to the assigning of the first port identifier to the second port, and wherein the first port is indicated as a backup port for the logical path and the second port is indicated as an active port for the logical path after the assigning of the first port identifier to the second port.

11. A controller node to manage access of data in at least one storage device, comprising:
   a first port initially to be assigned a first port identifier to allow establishment of a logical path between the first port identifier and a port identifier of a port at a host device wherein the first port identifier is a first port world wide name;
   a processor; and failover instructions executable on the processor to detect failure at the first port, and to initiate a failover procedure in response to the detected failure, wherein the failover procedure includes:
- re-assigning the first port identifier from the first port to a second port to cause the logical path to be associated with the second port after the re-assigning,
- in response to detecting resolution of the failure, use a probe identifier temporarily assigned to the first port to perform a test communication in a communications fabric, the probe identifier different from the first port identifier, wherein the probe identifier is a second port world wide name; and
- in response to determining from the test communication that network infrastructure in the communications fabric is healthy, assign the first port identifier back to the first port to perform failback to re-associate the logical path with the first port.

12. The controller node of claim 11, wherein the first port is indicated as an active port for the logical path and the second port is indicated as a backup port for the logical path prior to the failover procedure, and wherein the first port is indicated as a backup port for the logical path and the second port is indicated as an active port for the logical path after the failover procedure.

13. The controller node of claim 11, wherein the second port is initially assigned a second port identifier prior to the failover procedure, and wherein the second port is assigned the first and second port identifiers after the failover procedure.

14. The controller node of claim 11, wherein the test communication is performed after login using the probe identifier of the first port with the communications fabric, and wherein after determining that the network infrastructure is healthy, the first port is logged out from the communications fabric to allow performance of the failback.

15. An article comprising at least one non-transitory machine-readable storage medium storing instructions that upon execution cause a controller node to:
- detect a failure at a first port of the controller node that manages access of data in at least one storage device, wherein the first port is initially assigned a first port identifier and is associated with a logical path through a communications fabric between the first port and a port at a host device;
- in response to detecting the failure, assign the first port identifier to a second port to cause the logical path to be associated with the second port;
- in response to detecting resolution of the failure, assign a probe identifier to the first port, the probe identifier different from the first port identifier;
- using the probe identifier, check a health of a network infrastructure between the first port and the host device, wherein the probe identifier is a port world wide name temporarily assigned to the first port to check the health of the network infrastructure between the first port and the host device; and
- in response to the checking using the probe identifier determining that the network infrastructure is healthy, assign the first port identifier to the first port to cause failback of the logical path to the first port.

16. The article of claim 15, wherein the first port is indicated as an active port for the logical path and the second port is indicated as a backup port for the logical path prior to the assigning of the first port identifier to the second port, and wherein the first port is indicated as a backup port for the logical path and the second port is indicated as an active port for the logical path after the assigning of the first port identifier to the second port.

* * * * *